United States Patent
Moynihan

[15] 3,649,068
[45] Mar. 14, 1972

[54] ADJUSTABLE SLEEVE FOR SUN VISORS

[72] Inventor: John J. Moynihan, 440 East 79th Street, New York, N.Y. 10021

[22] Filed: Jan. 8, 1970

[21] Appl. No.: 1,491

[52] U.S. Cl. ..................................................296/97 C
[51] Int. Cl. ......................................................B60j 3/02
[58] Field of Search ..........................296/97 R, 97 B, 97 C

[56] References Cited

UNITED STATES PATENTS

| | | | |
|---|---|---|---|
| 2,432,674 | 12/1947 | Office | 296/97 |
| 2,948,566 | 8/1960 | Massey | 296/97 |
| 2,842,395 | 7/1958 | Davis | 296/97 |
| 2,238,981 | 4/1941 | Newell | 296/97 |
| 3,480,322 | 11/1969 | Pollak | 296/97 |

Primary Examiner—Benjamin Hersh
Assistant Examiner—John A. Pekar
Attorney—Charles R. Fay

[57] ABSTRACT

In combination with a conventional sun visor for a vehicle, a sleeve mounted thereon for longitudinal adjustment with respect thereto, said sleeve having opposite sides cut out at opposite ends thereof to accommodate the hanger bracket for the sun visor and also to avoid interference with the mirror or other obstacle at the opposite ends of adjustment of the sleeve with respect to the visor.

5 Claims, 8 Drawing Figures

Patented March 14, 1972 3,649,068
2 Sheets-Sheet 1
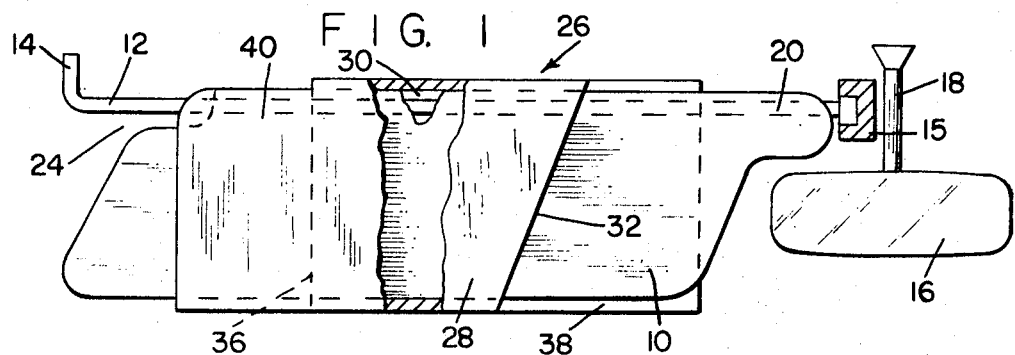
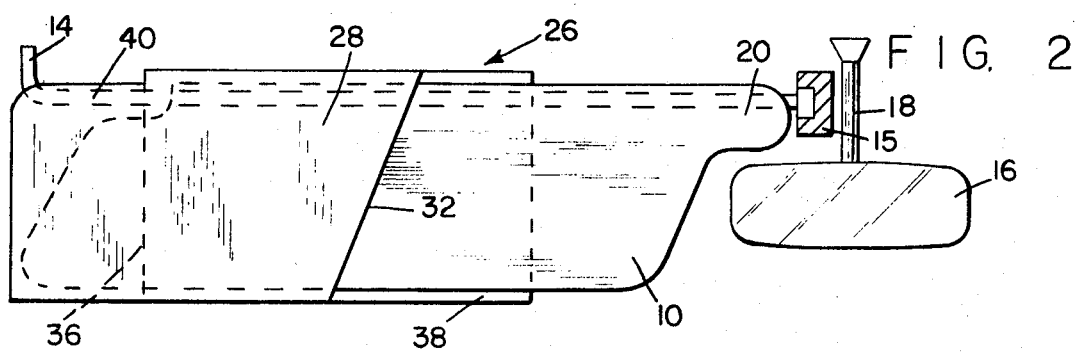
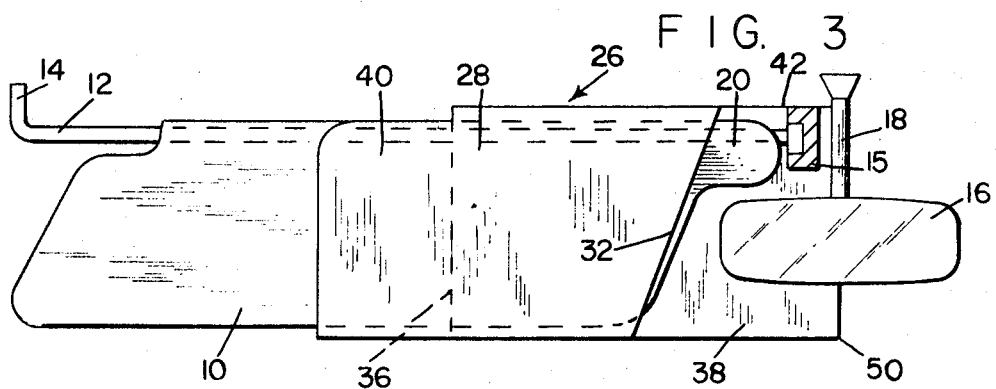
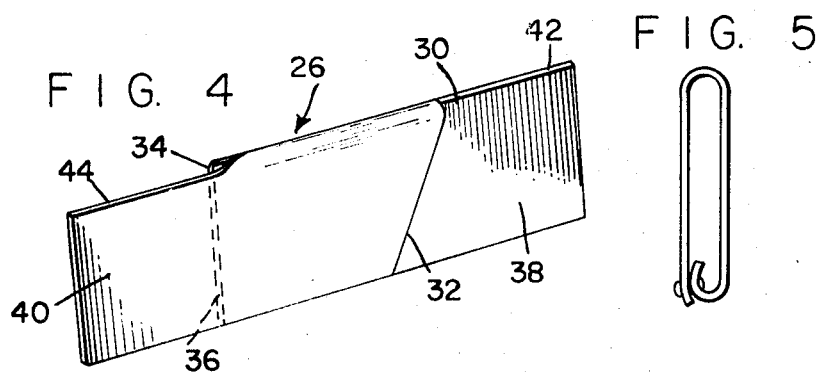
INVENTOR
JOHN J. MOYNIHAN
BY *Charles R. Fay*,
ATTORNEY

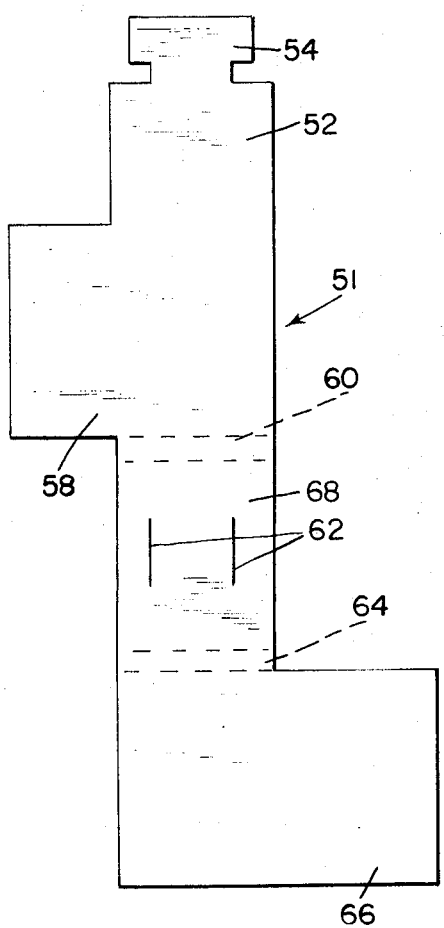
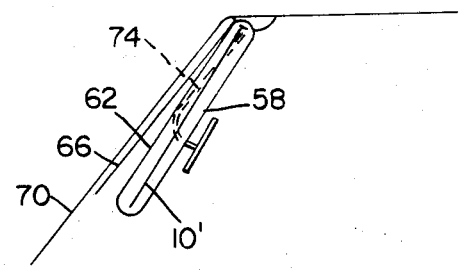
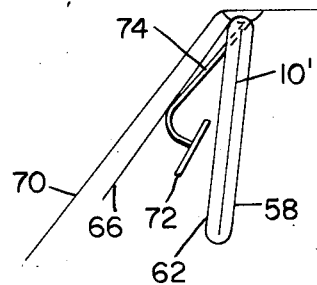
INVENTOR
JOHN J. MOYNIHAN
BY Charles R. Fay,
ATTORNEY

ADJUSTABLE SLEEVE FOR SUN VISORS

BACKGROUND OF THE INVENTION

There have been many suggestions in the prior art for auxiliary sun visor attachments or for extensible sun visors so that the area covered by the visor may be increased for the purpose of blacking out portions of the windshield not covered by the conventional visor. However in spite of the voluminous prior art and many suggestions, for an essentially simple device, none so far have answered the problem in all respects.

SUMMARY OF THE INVENTION

In the present case a very simple sleeve is mounted on the conventional visor and this sleeve has a cut out portion at one side thereof at one end and a cut out portion at the opposite side thereof at the opposite end. This visor when in normal position and regarded by the driver (or passenger) has a cut out portion facing the driver for instance at the right-hand end of the conventional visor. When the sleeve is moved to the right and extends beyond the visor, it enters a position between the windshield and the conventional rear vision mirror without disturbing the mirror or its adjustment and negotiating the visor rod receptacle near the mirror. On the other hand, the other side of the sleeve, the forward side, is cut out to accommodate the hanger bracket which is at the left-hand end as regards the driver, so that the sleeve may be moved beyond the left-hand end of the conventional visor to blank out unwanted rays of light in this area and still avoiding interference with the windshield post or roof, a similar sleeve is provided for the passenger side of the vehicle, but having its parts reversed.

BRIEF DESCRIPTION OF THE DRAWINGS

FIG. 1 is a view in elevation illustrating a conventional vehicle sun visor with the novel attachment thereon and showing a general relationship between the usual rear vision mirror and the hanger bracket for the sun visor;

FIG. 2 is a similar view illustrating the sleeve at its left-hand extremity of adjustment;

FIG. 3 is a similar view illustrating the sleeve at its right-hand limit of adjustment;

FIG. 4 is a perspective view of the sleeve;

FIG. 5 is an end view showing a modification;

FIG. 6 is a view showing a modification of the invention in extended form; and

FIGS. 7 and 8 are views partly in section illustrating diagrammatically the modification of FIG. 6 applied to a windshield visor.

PREFERRED EMBODIMENT OF THE INVENTION

The reference numeral 10 illustrates a modern day conventional sun visor. It is mounted to swing or rotate on a rod 12 mounted as at 14 at the left-hand side of the forward portion of the roof of the vehicle, usually having a receptacle 15 generally centrally of the windshield to releasably hold the free end of the rod. This is usually duplicated at the right side of the vehicle. It extends in general from bracket 14 to a point adjacent the usual rear vision mirror 16, the latter being ordinarily mounted on a swivel or the like 18 depending from a forward portion of the roof at the center or mounted on the windshield itself. The visor 10 often has a projection 20 which is an attempt to block out the sun's rays adjacent the mirror.

However as is well known there is an area near the center of the windshield that is not covered by this visor and when the sun is in this particular relationship with respect to the car, the driver is disconcerted. There are also non-protected areas indicated at 24 at the left-hand side under the bracket, and adjacent the mirror at the lower part thereof. All of this is well known to any driver.

The invention in this case provides a sleeve generally indicated by the numeral 26, which sleeve essentially comprises a rear side surface 28 and a forward side surface 30 joined together at their upper and lower edges to form the sleeve which fits over the sun visor 10 and can be slipped on and off.

The sleeve has a rearward cut away portion as for instance along the line 32 and at its opposite side it has a forward cut away portion as at 34, see particularly FIG. 4. In some cases these cut away portions may be complementary to each other, and cut on straight, slanted or other lines shown in FIGS. 1, 2 and 3. The forward cut away portion along the line at 36 may well be straight or even curved.

This therefore leaves a forward opaque area 38 and a rearward opaque area 40, the front and rear sides of the sleeve being free and unencumbered at the top edges thereof as in the area at 42 and at 44.

In FIG. 1 the sleeve is shown as in a neutral position where it really accomplishes nothing but it can be slid to the right, as shown in FIG. 3, wherein the portion 38 underlies the mirror and its bracket, being between the same and the windshield, blanking out the entire area between the bracket 18 and to a point below the mirror as at 50, see FIG. 3.

Conversely the sleeve may be slid to the left covering the exposed portion of rod 12 shown in FIG. 1 and completely covering the corner portion of the windshield.

This construction provides for a more effective blocking off in areas hitherto not so blocked off adjacent the mirror and the bracket, and this is done without varying the adjustment of the rear view mirror. It must be realized that almost every driver has his own favorite position of the rear view mirror because of differences in size, etc. It must also be realized that with a similar but reversed sleeve on the opposite sun visor, the entire area at the center of the windshield behind the mirror can be blocked off.

This invention also allows the sun visor itself to be adjusted to the best possible location for the individual driver and when the sleeve which is the subject of the present invention is moved, it does not vary this adjustment. The conventional visor can be even placed exactly perpendicular to the ground to make its lowest horizontal edge at the lowest point and the same thing is still true.

Because the extension at the left hand portion is on the rearward side of the conventional sun visor only, it can fit closely into the corner of the windshield and completely block it off without any interference by the windshield, the side post, or the roof of the car.

FIG. 6 shows a modification wherein a blank generally indicated at 51 can be cut out by a single cutter. This blank is of any suitable material, e.g., fabrics, plastics, paper, leather, etc., and comprises a flexible portion 52 having a head or the like 54.

The part 58 corresponds to the section 28, 40 in FIGS. 1 and 4 and numeral 60 indicates a fold line therefor. There may be slots or other means 62 in a part 68 for reception of the head 54, and a fold line 64 is provided for a large body portion 66 which corresponds to the main body portion for instance 38 in FIGS. 1 and 2.

This provides for a considerable adjustment of the length from head 54 to the area at 68 in FIG. 6 because the head 54 may be inserted into the slots 62 to any degree desired. Any kind of fastening material may be used and in some cases Velcro is indicated as applicable here as well as in areas to connect body portion 66 with respect to an area at 67.

This particular modification is particularly adaptable to certain modern American cars which leave little room for the area at 66 because some mirrors are positioned forward of the visor, and when the latter is held perpendicular there is interference. The mirror 72 is mounted on bracket 74 very close to the windshield 70. Using the modification of FIG. 6, and the operator desiring to have his visor perpendicular, he first pushes the visor and encompassing sleeve, with the visor held between part 58 and the portion 68, to the windshield. He then moves these parts laterally so that the part 66 passes between the mirror bracket and the windshield, and then pulls the visor and sleeve down to the desired perpendicular position, FIG. 8. The visor is indicated at 10' and this is equivalent to that at 10 in FIG. 1.

Conventional sun visors cannot be constructed so as to completely cover the corner area because such a design would prevent the ability of the visor to swing over to cover the side window as is needed when the glare comes from this area. The present invention however does not interfere with the use of the conventional visor on the side window, and even then it can be extended additionally so as to cover a greater part of the window.

The construction of the present invention is extremely simple with no wires or frames needed and as shown in FIG. 5 a line of snap fasteners can be used to adjustably connect a flat member together to form the sleeve or of course the sleeve may be made as a sleeve in the first place without any fastenings. A very few basic sizes can be adjusted to fit substantially all cars.

In addition the present invention is extremely inexpensive to make, it is soft with no metal parts, it covers the area desired to be covered without interference with any of the normal uses of the conventional visor or the mirror, etc., and it is extremely easily operated.

I claim:

1. The combination of an extension member with a conventional vehicle sun visor and an end supported rod in turn supporting the visor, said extension member comprising front and rear elongated elements connected at their longitudinal edges and having open end edges to form a sleeve slidably receivable on the visor, each element overlapping and extending past the other element at opposite ends of the sleeve, leaving a blank area on each element at opposite ends and at opposite sides of the sleeve, one blank area accommodating the supported end of the rod so that the sleeve is adapted to slide in part past the supported end of the rod, and the other blank area being adapted to accommodate any obstacle present at the other end of the visor so that the sleeve is also adapted to slide in part past any such obstacle.

2. The combination of claim 1 wherein the blank in the rear element is at the right-hand end of the sleeve so that the front element extends past the rear element at the right-hand end of the visor and thereby is enabled to slide under the obstacle in a forward direction, the obstacle being thereby in full view of an occupant of the vehicle.

3. The combination of claim 1 including a rear vision mirror as an obstacle, the blank in the rear element accommodating the mirror so that it is not concealed when the sleeve is moved to a position wherein the front element underlies the mirror.

4. The combination of claim 1 including means to adjust the circumferential dimension of the sleeve, accommodating visors of different sizes.

5. The combination of claim 1 including an extra panel secured to one of said elements at the edge of said element adjacent the supporting rod and depending from the said edge of the element in the area of the visor, to be positionable in the area of the obstacle.

* * * * *